United States Patent
Wu et al.

(10) Patent No.: US 9,215,105 B2
(45) Date of Patent: Dec. 15, 2015

(54) EQUALIZER AND SIGNAL RECEIVER THEREOF

(75) Inventors: Pei-Si Wu, Kaohsiung (TW); An-Ming Lee, Hsin-Chu Hsien (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 631 days.

(21) Appl. No.: 13/040,267

(22) Filed: Mar. 4, 2011

(65) Prior Publication Data

US 2011/0243215 A1 Oct. 6, 2011

(30) Foreign Application Priority Data

Apr. 1, 2010 (TW) ................................ 99110126 A

(51) Int. Cl.
*H04L 25/03* (2006.01)
(52) U.S. Cl.
CPC .... *H04L 25/03057* (2013.01); *H04L 25/03038* (2013.01); *H04L 2025/0349* (2013.01)
(58) Field of Classification Search
USPC .......... 375/229, 232, 233, 295, 316, 345, 348
See application file for complete search history.

(56) References Cited

U.S. PATENT DOCUMENTS

| | | | |
|---|---|---|---|
| 2006/0215745 A1* | 9/2006 | Woodward et al. ........... | 375/229 |
| 2007/0253475 A1 | 11/2007 | Palmer | |
| 2009/0296791 A1 | 12/2009 | Agazzi | |
| 2010/0027712 A1* | 2/2010 | Poulton ......................... | 375/295 |
| 2010/0103999 A1* | 4/2010 | Leibowitz et al. ............ | 375/233 |
| 2011/0096824 A1* | 4/2011 | Agazzi et al. ................. | 375/233 |
| 2012/0327993 A1* | 12/2012 | Palmer .......................... | 375/232 |

\* cited by examiner

*Primary Examiner* — Leon-Viet Nguyen
(74) *Attorney, Agent, or Firm* — McClure, Qualey & Rodack, LLP

(57) ABSTRACT

An equalizer includes a first sampler, a second sampler, and an equalization circuit. The first sampler is used for sampling an input data to generate an output data, and the second sampler is used for sampling the input data to generate an edge information. The equalization circuit is coupled to the first sampler and the second sampler, and includes an equalization unit and a control unit. The equalization unit performs an equalization operation on an original input data in order to generate the input data according to a plurality of tap coefficients. The control unit is coupled to the equalization unit, for adjusting the plurality of tap coefficients according to the output data and the edge information.

18 Claims, 6 Drawing Sheets

EQUALIZER AND SIGNAL RECEIVER THEREOF

BACKGROUND OF THE INVENTION

1. Field of the Invention

The present invention relates to an equalizer and a signal receiver thereof, more particularly, to an equalizer and a signal receiver capable of adjusting tap coefficients of the equalizer by using an output data as well as edge information generated from its sampler(s).

2. Description of the Prior Art

In a communication system, ISI (inter symbol interference) is a common phenomenon, which is mainly caused from different speeds at different frequencies. Therefore, a signal receiver of the communication system usually adopts an equalizer to solve the impact resulted from the multi-path signal transmission during signal transmissions.

A conventional signal receiver usually comprises a decision feedback equalizer and a clock and data recovery circuit (CDR). However, most internal components of the decision feedback equalizer and the CDR cannot be shared currently. That is, two independent internal components are required for each other. Generally speaking, totally four sets of samplers are required in the conventional signal receiver, wherein the CDR requires an output data sampler and an edge sampler for sampling the input data in order to generate the output data and the edge information, respectively; and the decision feedback equalizer requires two threshold samplers for sampling the high level and the low level of the input data respectively in order to obtain the amplitude of the equalized input data and adjust the degree of equalization accordingly. For this reason, the considerations upon the cost and power consumption of the conventional signal receiver are not satisfactory.

SUMMARY OF THE INVENTION

One object of the present invention is to provide an equalizer and a related signal receiver to solve the abovementioned problems.

One object of the present invention is to provide an equalizer capable of adjusting tap coefficients of the equalizer by using an output data as well as an edge information generated from its sampler(s).

Another object of the present invention is to provide a signal receiver which shares sampler(s) of the clock and data recovery circuit in order to save the number of the sampler(s) in the equalizer.

According to an embodiment of the present invention, an equalizer comprises a first sampler, a second sampler, and an equalization circuit. The first sampler is arranged to sample an input data to generate an output data. The second sampler is arranged to sample the input data to generate an edge information. The equalization circuit is coupled to the first sampler and the second sampler. The equalization circuit includes an equalization unit and a control unit. The equalization unit is arranged to perform an equalization operation on an original input data in order to generate the input data according to a plurality of tap coefficients. The control unit is coupled to the equalization unit, and is arranged to adjust the plurality of tap coefficients according to the output data and the edge information.

According to another embodiment, a signal receiver is provided. The signal receiver includes a clock and data recovery circuit as well as an equalization circuit. The clock and data recovery circuit includes a first sampler, a second sampler, and a clock and data recovery unit. The first sampler is arranged to sample an input data to generate an output data according to an output data clock. The second sampler is arranged to sample the input data to generate an edge information according to an edge clock. The clock and data recovery unit is coupled to the first sampler and the second sampler, and is arranged to provide the output data clock and the edge clock. The equalization circuit is coupled to the first sampler and the second sampler of the clock and data recovery circuit. The equalization circuit includes an equalization unit and a control unit. The equalization unit is arranged to perform an equalization operation on an original input data in order to generate the input data according to a plurality of tap coefficients. The control unit is coupled to the equalization unit as well as the first sampler and the second sampler of the clock and data recovery circuit, and is arranged to adjust the plurality of tap coefficients according to the output data and the edge information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is in an under-equalized status.

FIG. 2 is in an over-equalized status.

DETAILED DESCRIPTION

Figure 1:
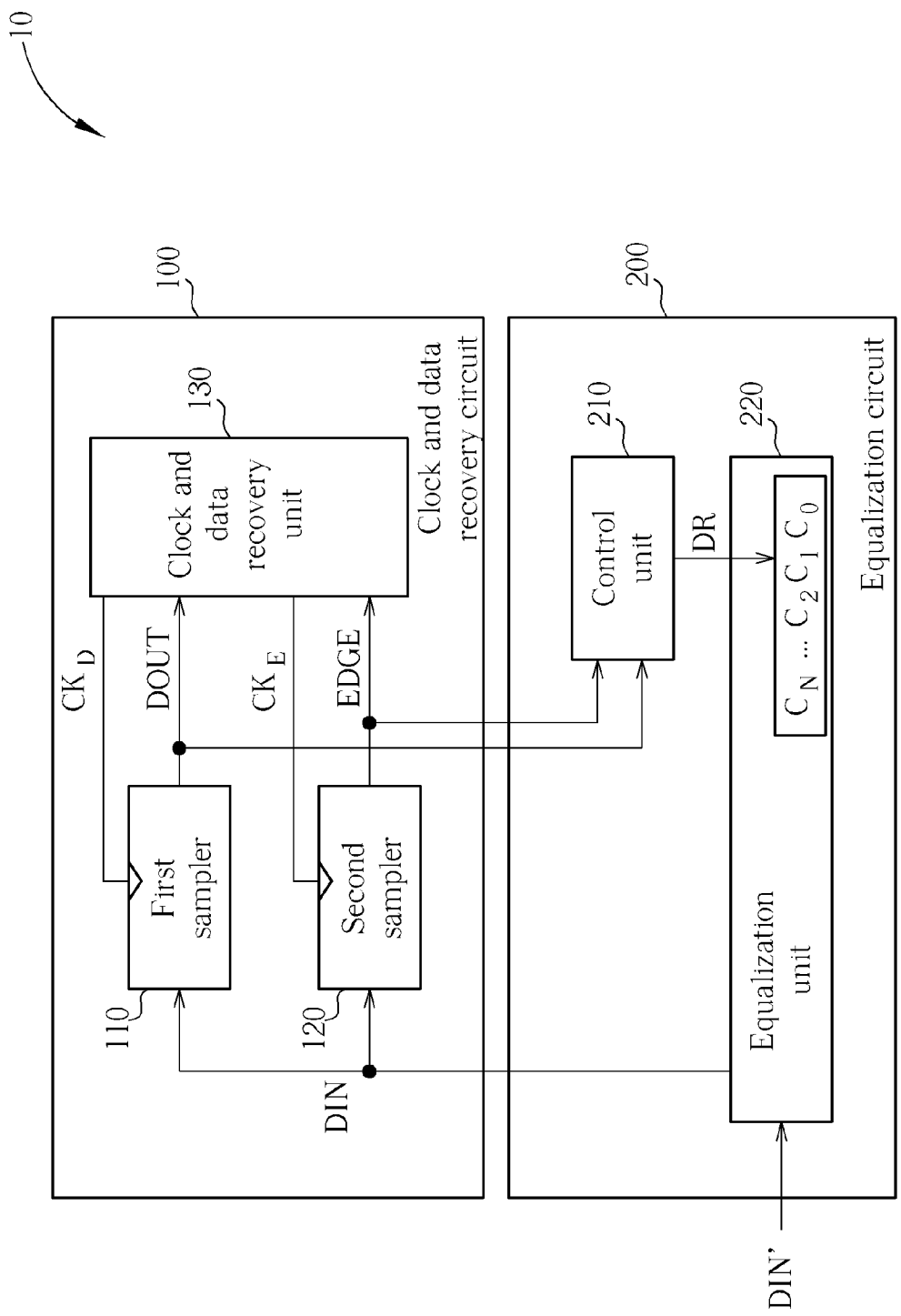
FIG. 1 is a block diagram of a signal receiver according to an embodiment of the present invention.

Please refer to FIG. 1. FIG. 1 is a block diagram of a signal receiver 10 according to an embodiment of the present invention. The signal receiver 10 includes, but is not limited to, a clock and data recovery circuit (CDR circuit) 100 and an equalization circuit 200. The CDR circuit 100 may include a first sampler 110, a second sampler 120, and a clock and data recovery unit (CDR unit) 130. The first sampler 110 is arranged to sample an input data DIN to generate an output data DOUT according to an output data clock $CK_D$. The second sampler 120 is arranged to sample the input data DIN to generate an edge information EDGE according to an edge clock $CK_E$. The input data DIN is generated by performing an equalization operation on an original input data DIN' via an equalization unit 220 of the equalization circuit 200. The CDR unit 130 is coupled to the first sampler 110 and the second sampler 120, arranged to generate the output data clock $CK_D$ according to the output data DOUT and feedback to the first sampler 110, and generate the edge clock $CK_E$ according to the edge information EDGE and feedback to the second sampler 120. As operations related to the CDR circuit 100 are already well-known to those skilled in the art, and further description is omitted here for brevity.

The equalization circuit 200 is coupled to the CDR circuit 100, and may include an equalization unit 220 and a control unit 210. The equalization unit 220 is arranged to perform an equalization operation on the original input data DIN' in order to generate the input data DIN according to a plurality of tap coefficients C0~CN. The control unit 210 is coupled to the equalization unit 220 as well as the first sampler 110 and the second sampler 120, and is arranged to adjust the plurality of tap coefficients C0~CN according to the output data DOUT and the edge information EDGE. In this embodiment, the control unit 210 may generate a determining result DR according to the output data DOUT as well as the edge information EDGE, and then adjust the plurality of tap coefficients C0~CN of the equalization unit 220 according to the determining result DR. Be noted that the determining result DR is indicative of a condition that the equalization circuit 200 is in an over-equalized status or an under-equalized status. Operations of how the control unit 210 adjusts the plurality of tap coefficients C0~CN according to the output data DOUT and the edge information EDGE will be detailed in the following embodiments.

Figure 2:
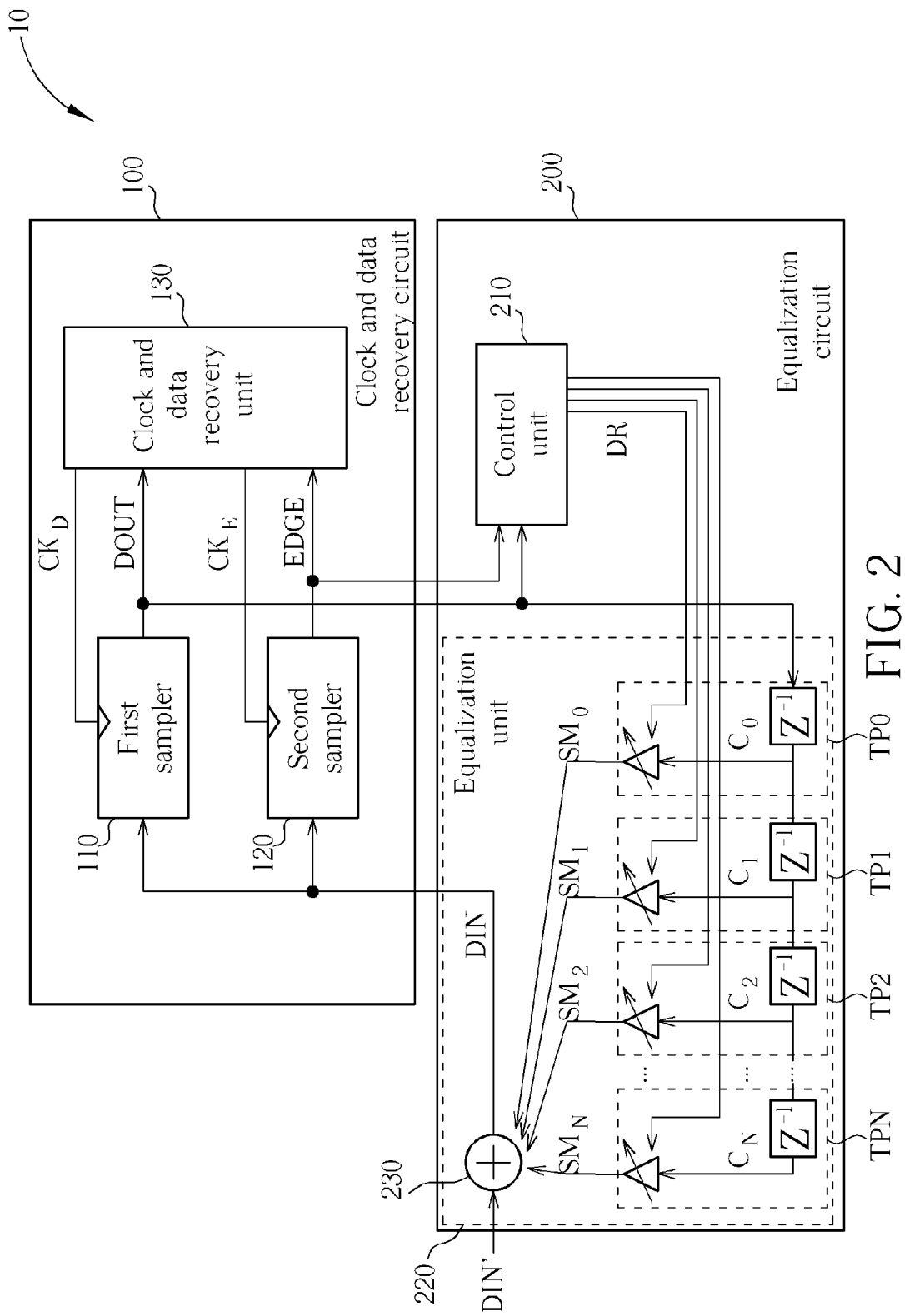
FIG. 2 is a diagram illustrating detailed circuits of the equalization unit of the signal receiver shown in FIG. 1 according to an embodiment of the present invention.

FIG. 2 is a diagram illustrating detailed circuits of the equalization unit 220 of the signal receiver 10 shown in FIG. 1 according to an embodiment of the present invention. As shown in FIG. 2, the equalization unit 220 may include a plurality of taps TP0~TPN as well as an adder 230. The plurality of taps TP0~TPN are cascaded to each other, and are arranged to receive the output data DOUT and generate a plurality of multiplied signals SM0~SMN according to the output data DOUT and the plurality of tap coefficients C0~CN, respectively. The adder 230 is coupled to the plurality of taps TP0~TPN, and is arranged to sum the original input data DIN' and the plurality of multiplied signals SM0~SMN up in order to generate the input data DIN.

Please note that, in this embodiment, the equalization unit 220 may be implemented by a decision feedback equalizer, but the present invention is not limited to this only. That is, an equalizer with other types can be adopted.

Figure 3:
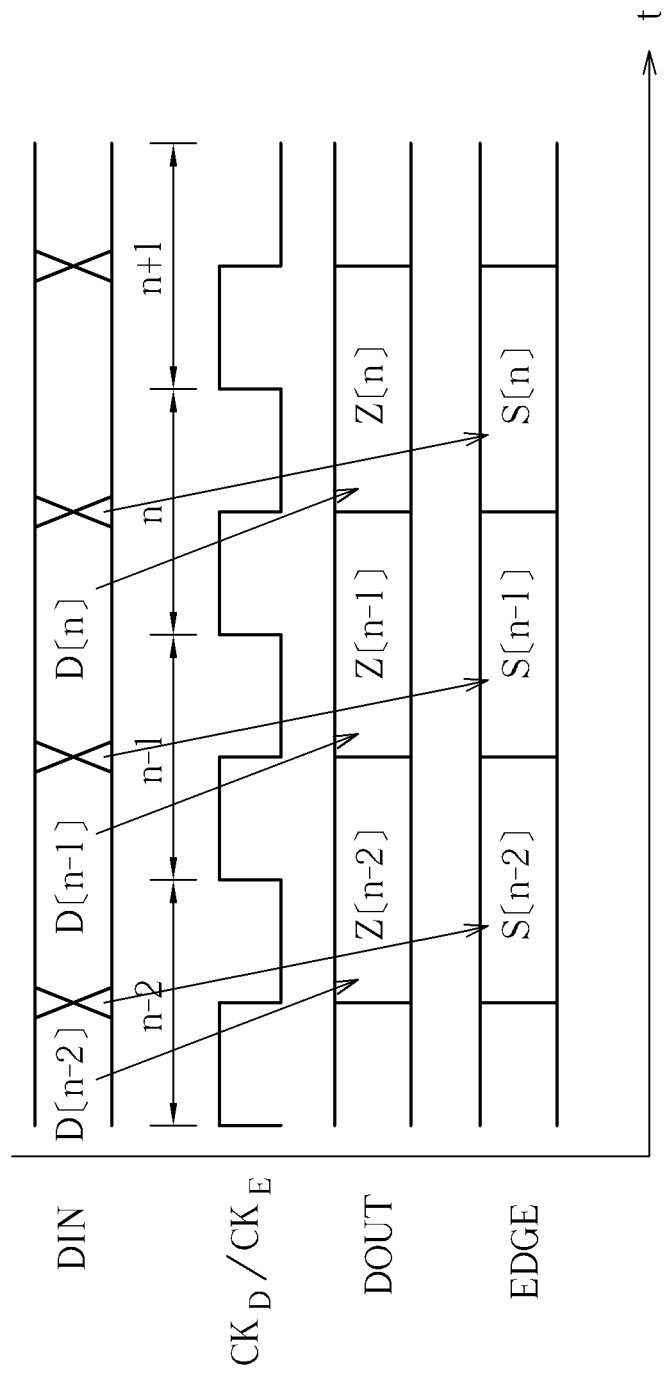
FIG. 3 is a diagram showing signal waveforms of the input data, the output data, and the edge information shown in FIG. 1 or FIG. 2.

In the following, brief descriptions of the abovementioned output data DOUT as well as the edge information EDGE are given in order to facilitate a better understanding of features of the present invention. Please refer to FIG. 3. FIG. 3 is a diagram showing signal waveforms of the input data DIN, the output data DOUT, and the edge information EDGE shown in FIG. 1 or FIG. 2. The input data DIN is sequentially represented by a first input data D[n−2], a second input data D[n−1], and a third input data D[n] in a time axis. The first sampler 210 and the second sampler 220 respectively sample the input data DIN according to the output data clock $CK_D$ and the edge clock $CK_E$. For example, the input data DIN can be sampled on the rising edge of the output data clock $CK_D$/the edge clock $CK_E$. As a result, the sampled output data DOUT can be sequentially represented by a first output data Z[n−2], a second output data Z[n−1], and a third output data Z[n] in the time axis; and the edge information EDGE can be sequentially represented by a first edge signal S[n−2], a second edge signal S[n−1], and a third edge signal S[n]. Please note that the first output data Z[n−2], the second output data Z[n−1], and the third output data Z[n] are corresponding to the first edge signal S[n−2], the second edge signal S[n−1], and the third edge signal S[n], respectively.

The eye jitter of the input data DIN can be obtained by reference to the eye diagram of the input data DIN. First, assume that the eye jitter of the input data DIN is accumulated by low-pass channels, such that the amplitude of the input data DIN is in direct proportion to the eye width of the eye diagram. After the input data DIN has been attenuated by a long cable, two conditions may happen: under a first condition, a jitter lag may cause when the run length (RL) of the input data DIN is greater than 1; under a second condition, a jitter lead may cause when the run length (RL) of the input data DIN is equal to 1. For this reason, when the eye width of the input data DIN is determined to be too large according to the edge information EDGE, the amplitude of the input data DIN needs to be decreased; when the eye width of the input data DIN is determined to be to narrow according to the edge information EDGE, the amplitude of the input data DIN needs to be increased. In other words, the control unit 210 may obtain the current equalized status according to the edge information EDGE as well as the output data DOUT, and may accordingly determine to turn up or turn down the plurality of tap coefficients C0~CN of the equalization unit 220 so as to adjust the amplitude of the input data DIN.

Figure 4:
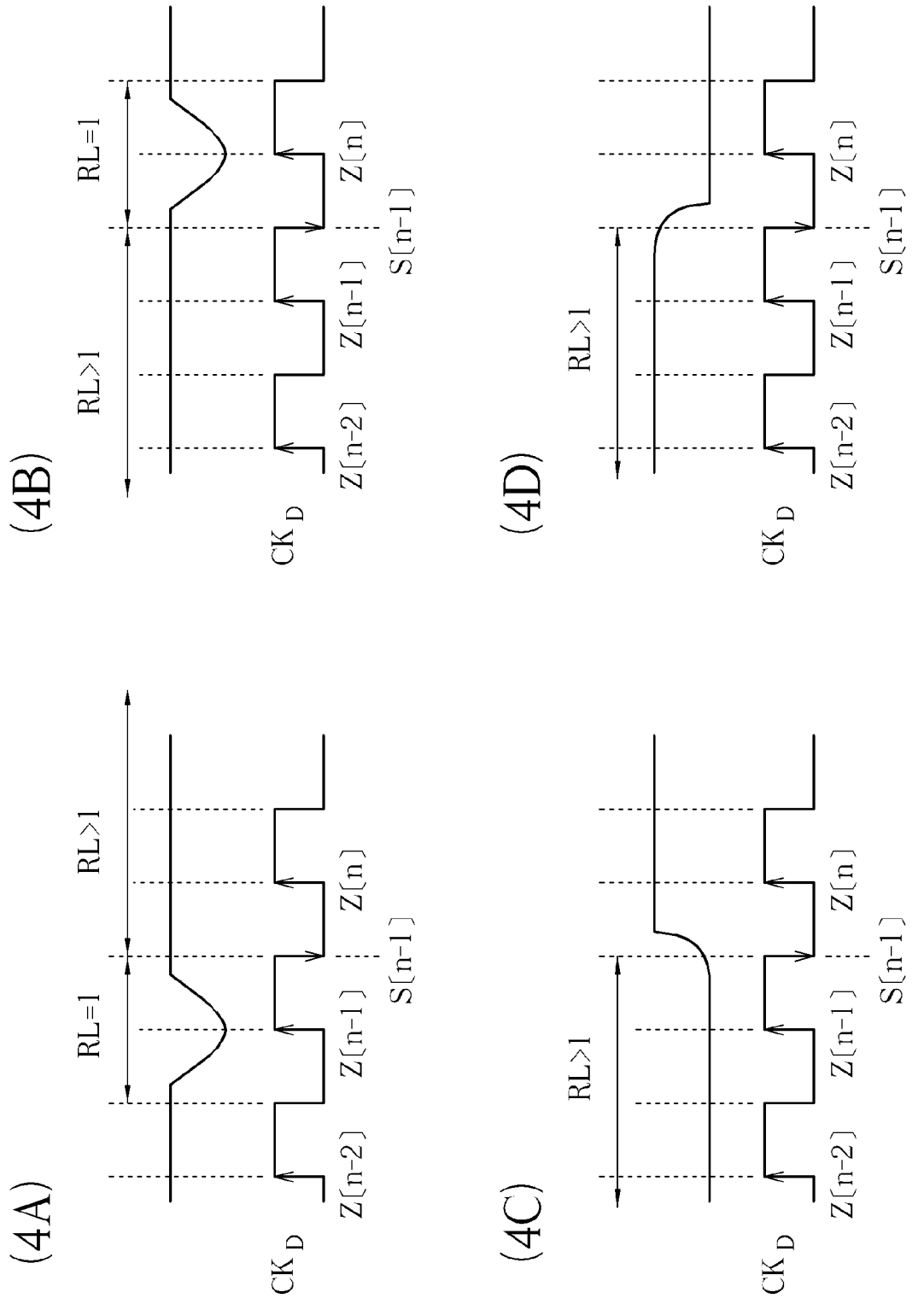
FIG. 4 (including sub-diagrams 4A, 4B, 4C, and 4D) is a diagram illustrating the equalization circuit shown in FIG. 1

In the following, some examples are cited for illustrating how the control unit 210 adjusts the plurality of tap coefficients C0~CN of the equalization unit 220 according to the output data DOUT and the edge information EDGE. Please refer to FIG. 4. FIG. 4 (including sub-diagrams 4A, 4B, 4C, and 4D) is a diagram illustrating the equalization circuit 200 shown in FIG. 1 or FIG. 2 is in an under-equalized status. In order to simplify the drawing, only the output data clock $CK_D$ is shown in the sub-diagrams 4A~4D. In this embodiment, the output data clock $CK_D$ is half unit interval (UI) delay with the edge clock $CK_E$, and the first sampler 110 and the second sampler 120 respectively samples the input data DIN on the rising edge of the output data clock $CK_D$ and the edge clock $CK_E$. As a result, from the point of view of the output data clock $CK_D$, the sampling time of the edge information EDGE can be viewed as the falling edge of the output data clock $CK_D$, which is actually represented as the rising edge of the edge clock $CK_E$.

In this embodiment, the control unit 210 may be arranged to determine whether the input data DIN is during a transition according to a result that the adjacent output data in the time axis are equal to each other or not, and may be further arranged to determine the current equalized status according to the edge information EDGE obtained when the input data DIN is during the transition. As an illustration, as shown in 4A, the control unit 210 is arranged to compare the third output data Z[n] with the second output data Z[n−1]. When the third output data Z[n] is determined to be not equal to the second output data Z[n−1], which represents that the input data DIN is during the transition, the control unit 210 is further arranged to compare the currently obtained second edge signal S[n−1] with the first output data Z[n−2] in the previous adjacent timing so as to determine that the second edge signal S[n−1] is equal to the first output data Z[n−2] (i.e., S[n−1]=Z[n−2]). In other words, when the control unit 210 determines a condition that Z[n−1]≠Z[n] and S[n−1]=Z[n−2], it can determine that the equalization circuit 200 is in an under-equalized status currently. That is to say, the plurality of tap coefficients of the equalization circuit 200 are too small, such that the amplitude of the input data DIN is too small and thereby the edge information EDGE returns back to its original level before being sampled. Hence, the control unit 210 needs to turn up the plurality of tap coefficients C0~CN of the equalization circuit 200 at this time.

As another illustration, as shown in 4B, the control unit 210 is arranged to compare the third output data Z[n] with the second output data Z[n−1]. When the third output data Z[n] is determined to be not equal to the second output data Z[n−1], which represents that the input data DIN is during the transition, the control unit 210 is further arranged to compare the currently obtained second edge signal S[n−1] with the first output data Z[n−2] in the previous adjacent timing so as to determine that the second edge signal S[n−1] is equal to the first output data Z[n−2] (i.e., S[n−1]=Z[n−2]). In other words, when the control unit 210 determines a condition that Z[n−1]≠Z[n] and S[n−1]=Z[n−2], it can determine that the equalization circuit is in an under-equalized status currently. Hence, the control unit 210 needs to turn up the plurality of tap coefficients C0~CN of the equalization circuit 200 at this time.

Similarly, as shown in 4C and 4D, when the control unit 210 determines a condition that the input data DIN is during the transition and the currently obtained edge signal is equal to the output data in the previous adjacent timing, it can determine that the equalization circuit is in an under-equalized status currently. Hence, the control unit 210 needs to turn up the plurality of tap coefficients C0~CN of the equalization circuit 200 at this time.

Figure 5:
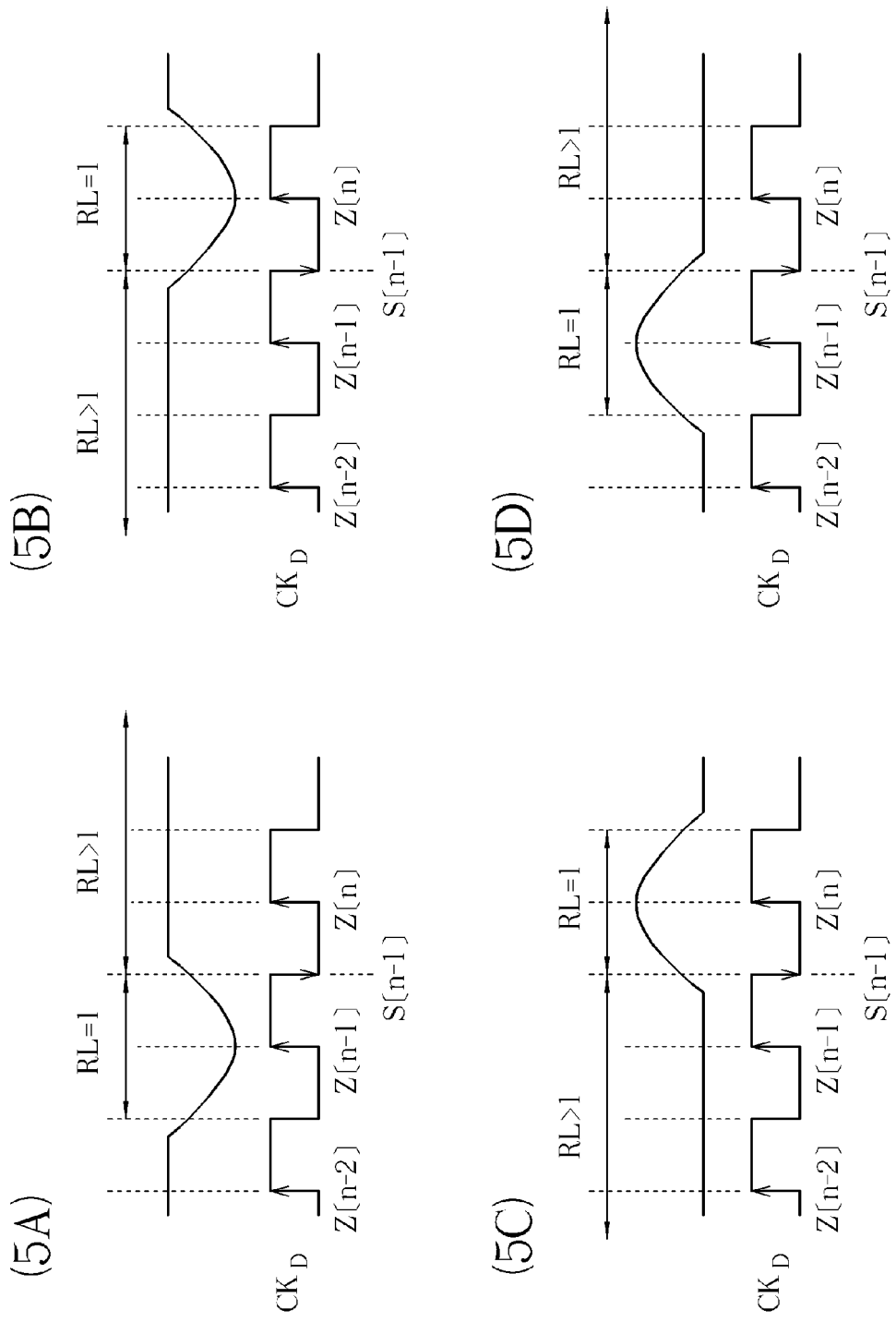
FIG. 5 (including sub-diagrams 5A, 5B, 5C, and 5D) is a diagram illustrating the equalization circuit shown in FIG. 1

Please refer to FIG. 5. FIG. 5 (including sub-diagrams 5A, 5B, 5C, and 5D) is a diagram illustrating the equalization circuit 200 shown in FIG. 1 or FIG. 2 is in an over-equalized status. In order to simplify the drawing, only the output data clock $CK_D$ is shown in the sub-diagrams 5A~5D. In this embodiment, the output data clock $CK_D$ is half unit interval (UI) delay with the edge clock $CK_E$, and the first sampler 110 and the second sampler 120 respectively samples the input data DIN on the rising edge of the output data clock $CK_D$ and the edge clock $CK_E$. As a result, from the point of view of the output data clock $CK_D$, the sampling time of the edge information EDGE can be viewed as the falling edge of the output data clock $CK_D$, which is actually represented as the rising edge of the edge clock $CK_E$.

In this embodiment, the control unit 210 may be arranged to determine whether the input data DIN is during the transition according to a result that the adjacent output data in the time axis are equal to each other or not, and may be further arranged to determine the current equalized status according to the edge information EDGE obtained when the input data DIN is during the transition. As an illustration, as shown in 5A, the control unit 210 is arranged to compare the third output data Z[n] with the second output data Z[n−1]. When the third output data Z[n] is determined to be not equal to the second output data Z[n−1], which represents that the input data DIN is during the transition, the control unit 210 is further arranged to compare the currently obtained edge signal S[n−1] with the first output data Z[n−2] in the previous adjacent timing so as to determine that the second edge signal S[n−1] is not equal to the first output data Z[n−2] (i.e., S[n−1]≠Z[n−2]). In other words, when the control unit 210 determines a condition that Z[n−1]≠Z[n] and S[n−1]≠Z[n−2], it can determine that the equalization circuit 200 is in an over-equalized status currently. That is to say, the plurality of tap coefficients of the equalization circuit 200 are too large, such that the amplitude of the input data DIN is too large and thereby the edge information EDGE has not returned back to its original level before being sampled. Hence, the control unit 210 needs to turn down at the plurality of tap coefficients C0~CN of the equalization circuit 200 at this time.

As another illustration, as shown in 5B, the control unit 210 is arranged to compare the third output data Z[n] with the second output data Z[n−1]. When the third output data Z[n] is determined to be not equal to the second output data Z[n−1], which represents that the input data DIN is during the transition, the control unit 210 is further arranged to compare the currently obtained second edge signal S[n−1] with the first output data Z[n−2] in the previous adjacent timing so as to determine that the second edge signal S[n−1] is not equal to the first output data Z[n−2] (i.e., S[n−1]≠Z[n−2]). In other words, when the control unit 210 determines a condition that Z[n−1]≠Z[n] and S[n−1]≠Z[n−2], it can determine that the equalization circuit is in an over-equalized status currently. Hence, the control unit 210 needs to turn down the plurality of tap coefficients C0~CN of the equalization circuit 200 at this time.

Similarly, as shown in 5C and 5D, when the control unit 210 determines a condition that Z[n−1]≠Z[n] and S[n−1]≠Z[n−2], it can determine that the equalization circuit is in an over-equalized status currently. Hence, the control unit 210 needs to turn down the plurality of tap coefficients C0~CN of the equalization circuit 200 at this time.

On the other hand, under a condition that the third output data Z[n] is equal to the second output data Z[n−1], the control unit 210 will determine that the equalization circuit 200 is not during the transition. Hence, the control unit 210 may maintain the plurality of tap coefficients C0~CN of the equalization circuit 200 at this time.

From the above, the control unit 210 may generate a determining result DR according to the output data DOUT as well as the edge information EDGE, and may adjust the plurality of tap coefficients C0~CN according to the determining result DR. Be noted that the determining result DR is indicative of a condition that the equalization circuit 200 is in the over-equalized status or the under-equalized status.

Be compared with the prior art, the equalizer disclosed in the present invention can adjust the plurality of tap coefficients according to the current equalized status of the edge information and the output data without detecting the amplitude of the input data. As a result, two threshold samplers can be saved. That is to say, a 2-bit ADC is not required, and thus the die size can be reduced so as to lower cost.

Figure 6:
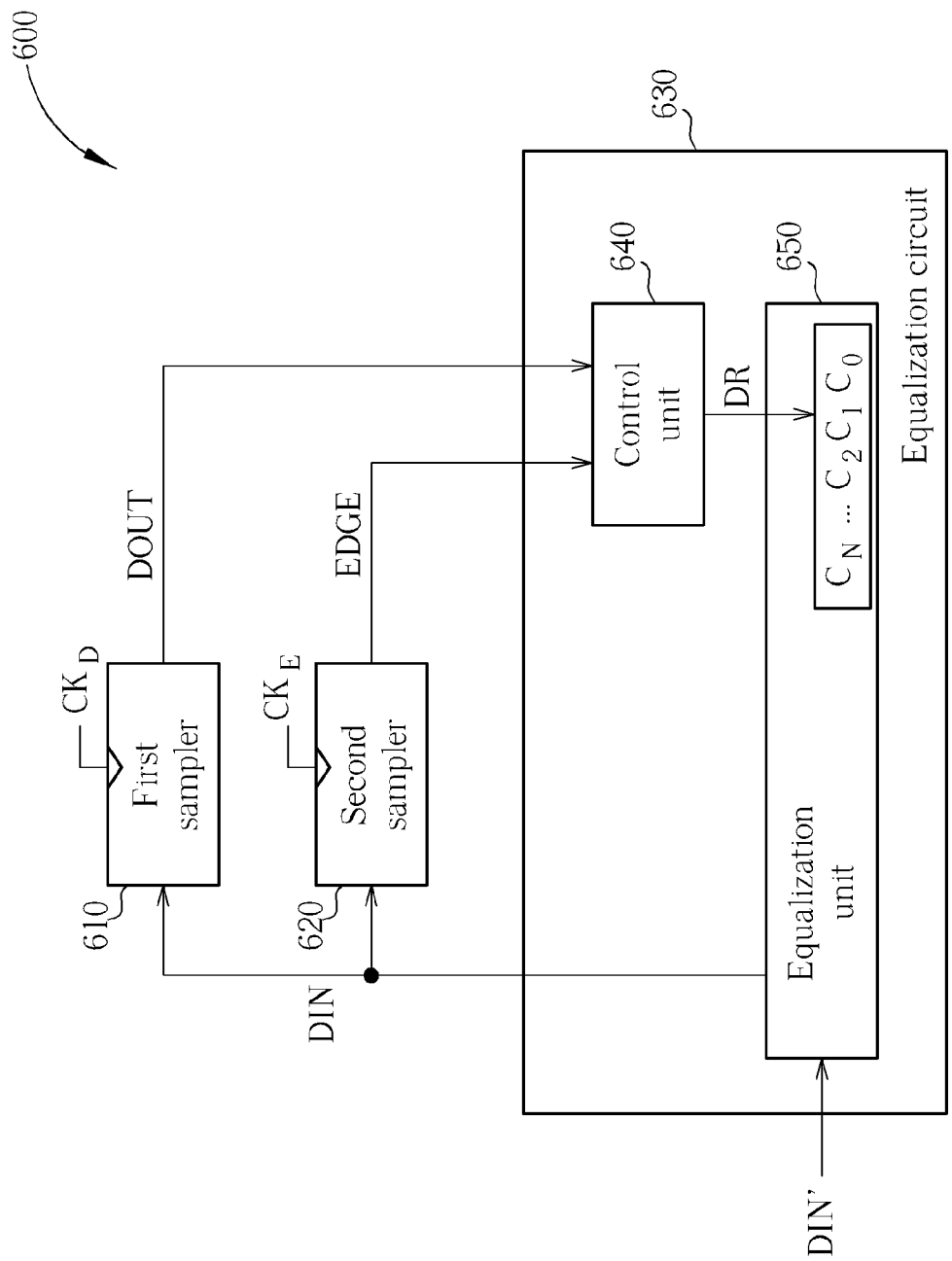
FIG. 6 is a diagram of an equalizer according to an embodiment of the present invention.

Please also note that, the abovementioned embodiments are presented merely for describing the features of the present invention, and in no way should be considered to be limitations of the scope of the present invention. For example, in other embodiments, the first sampler and the second sampler are not limited to be provided by the clock and data recovery circuit. Please refer to FIG. 6. FIG. 6 is a diagram of an equalizer 600 according to an embodiment of the present invention. As shown in FIG. 6 the equalizer 600 may include, but is not limited to, a first sampler 610, a second sampler 620, and an equalization circuit 630, wherein the equalization circuit 630 includes an equalization unit 640 and a control unit 650. In this embodiment, the operations of the first sampler 610, the second sampler 620, and the equalization circuit 630 are similar to the operations of the first sampler 110, the second sampler 120, and the equalization circuit 200 shown in FIG. 1, respectively. The major difference between them is that the first sampler 610 and the second sampler 620 shown in FIG. 6 are independent components, and are not limited to be disposed inside the clock and data recovery circuit.

Those skilled in the art should appreciate that various modifications of the signal receiver 10 and the equalizer 600 may be made without departing from the spirit of the present invention, which also belongs to the scope of the present invention.

The abovementioned embodiments are presented merely for describing the features of the present invention, and in no way should be considered to be limitations of the scope of the present invention. In summary, an equalizer and a related signal receiver is provided in the present invention. By making use of the output data DOUT and the edge information EDGE generated from the samplers, it can be known whether the equalization circuit is in the over-equalized status or the under-equalized status in order to achieve the goal of adjusting the tap coefficients of the equalizer. Furthermore, in a communication system, the samplers (such as, the output data sampler and/or the edge sampler) of the clock and data recovery circuit can be shared in order to replace the original samplers (such as, the threshold samplers) of the equalization circuit. Therefore, the die size can be reduced and the cost can be lowered in order to achieve the requirement of saving power.

Those skilled in the art will readily observe that numerous modifications and alterations of the device and method may be made while retaining the teachings of the invention.

What is claimed is:

1. An equalizer, comprising:
a first sampler, arranged to sample input data to generate output data;
a second sampler, arranged to sample the input data to generate edge information according to an edge clock; and
an equalization circuit, coupled to the first sampler and the second sampler, the equalization circuit comprising:
an equalization unit, arranged to perform an equalization operation on original input data according to a plurality of tap coefficients in order to generate the input data; and
a control unit, coupled to the equalization unit, and arranged to adjust the plurality of tap coefficients according to the output data and the edge information, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is equal to the second output data, maintains the plurality of tap coefficients.

2. The equalizer of claim 1, wherein the control unit is arranged to determine whether the input data is during a transition according to the output data, and determine whether the equalization circuit is in an over-equalized status or an under-equalized status according to the edge information for adjusting the plurality of tap coefficients when the input data is during the transition.

3. The equalizer of claim 1, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is not equal to the second output data and the second edge signal is equal to the first output data, the control unit turns up at least one part tap coefficients of the plurality of tap coefficients.

4. The equalizer of claim 1, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is not equal to the second output data and the second edge signal is not equal to the first output data, the control unit turns down at least one part tap coefficients of the plurality of tap coefficients.

5. The equalizer of claim 1, wherein the equalization unit comprises:
a plurality of taps, arranged to generate a plurality of multiplied signals according to the output data and the plurality of tap coefficients; and
an adder, arranged to sum the original input data and the plurality of multiplied signals up in order to generate the input data.

6. The equalizer of claim 1, wherein the equalization unit is a decision feedback equalizer (DFE).

7. A signal receiver, comprising:
a clock and data recovery circuit, comprising:
a first sampler, arranged to sample input data to generate output data according to an output data clock;
a second sampler, arranged to sample the input data to generate edge information according to an edge clock; and
a clock and data recovery unit, coupled to the first sampler and the second sampler, and arranged to provide the output data clock and the edge clock; and an equalization circuit, coupled to the first sampler and the second sampler of the clock and data recovery circuit, the equalization circuit comprising:
an equalization unit, arranged to perform an equalization operation on original input data in order to generate the input data according to a plurality of tap coefficients; and
a control unit, coupled to the equalization unit as well as the first sampler and the second sampler of the clock and data recovery circuit, and arranged to adjust the plurality of tap coefficients according to the output data and the edge information, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is not equal to the second output data and the second edge signal is equal to the first output data, the control unit turns up at least one part tap coefficients of the plurality of tap coefficients.

8. The signal receiver of claim 7, wherein the control unit is arranged to determine whether the input data is during a transition according to the output data; and determine whether the equalization circuit is in an over-equalized status or an under-equalized status according to the edge information in order to adjust the plurality of tap coefficients when the input data is during the transition.

9. The signal receiver of claim 7, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is equal to the second output data, the control unit maintains the plurality of tap coefficients.

10. The signal receiver of claim 7, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is not equal to the second output data and the second edge signal is not equal to the first output data, the control unit turns down at least one part tap coefficients of the plurality of tap coefficients.

11. The signal receiver of claim 7, wherein the equalization unit comprises:
a plurality of taps, arranged to generate a plurality of multiplied signals according to the output data and the plurality of tap coefficients; and an adder, arranged to sum the original input data and the plurality of multiplied signals up in order to generate the input data.

12. The signal receiver of claim 7, wherein the equalization unit is a decision feedback equalizer (DFE).

13. A signal receiver, comprising:
a clock and data recovery circuit, comprising:
a first sampler, arranged to sample input data to generate output data according to an output data clock;
a second sampler, arranged to sample the input data to generate edge information according to an edge clock; and
a clock and data recovery unit, coupled to the first sampler and the second sampler, and arranged to provide the output data clock and the edge clock; and an equalization circuit, coupled to the first sampler and the second sampler of the clock and data recovery circuit, the equalization circuit comprising:
an equalization unit, arranged to perform an equalization operation on original input data in order to generate the input data according to a plurality of tap coefficients; and
a control unit, coupled to the equalization unit as well as the first sampler and the second sampler of the clock and data recovery circuit, and arranged to adjust the plurality of tap coefficients according to the output data and the edge information, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is not equal to the second output data and the second edge signal is not equal to the first output data, the control unit turns down at least one part tap coefficients of the plurality of tap coefficients.

14. The signal receiver of claim 13, wherein the control unit is arranged to determine whether the input data is during a transition according to the output data; and determine whether the equalization circuit is in an over-equalized status or an under-equalized status according to the edge information in order to adjust the plurality of tap coefficients when the input data is during the transition.

15. The signal receiver of claim 13, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is equal to the second output data, the control unit maintains the plurality of tap coefficients.

16. The signal receiver of claim 13, wherein the output data sequentially comprises first output data, second output data, and third output data; the edge information sequentially comprises a first edge signal, a second edge signal, and a third edge signal; the first output data, the second output data, and the third output data are corresponding to the first edge signal, the second edge signal, and the third edge signal, respectively; and when the control unit determines that the third output data is not equal to the second output data and the second edge signal is equal to the first output data, the control unit turns up at least one part tap coefficients of the plurality of tap coefficients.

17. The signal receiver of claim 13, wherein the equalization unit comprises:
a plurality of taps, arranged to generate a plurality of multiplied signals according to the output data and the plurality of tap coefficients; and an adder, arranged to sum the original input data and the plurality of multiplied signals up in order to generate the input data.

18. The signal receiver of claim 13, wherein the equalization unit is a decision feedback equalizer (DFE).

* * * * *